(12) United States Patent
Tsuchiya et al.

(10) Patent No.: US 9,099,912 B2
(45) Date of Patent: Aug. 4, 2015

(54) ELECTROMAGNETIC COUPLING

(71) Applicant: KABUSHIKI KAISHA TOYOTA CHUO KENKYUSHO, Nagakute-shi, Aichi-ken (JP)

(72) Inventors: Eiji Tsuchiya, Nisshin (JP); Takao Watanabe, Nagakute (JP); Wataru Hijikata, Nagoya (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 158 days.

(21) Appl. No.: 13/907,078

(22) Filed: May 31, 2013

(65) Prior Publication Data

US 2013/0328430 A1 Dec. 12, 2013

(30) Foreign Application Priority Data

Jun. 11, 2012 (JP) .................................. 2012-131604

(51) Int. Cl.
*H02K 51/00* (2006.01)
(52) U.S. Cl.
CPC ...................................... *H02K 51/00* (2013.01)
(58) Field of Classification Search
CPC .... H02K 51/00; H02K 49/104; H02K 49/106
USPC .......................................... 310/126, 101, 103
See application file for complete search history.

(56) References Cited

U.S. PATENT DOCUMENTS

| 2002/0047484 A1* | 4/2002 | Umeda ........................ 310/263 |
| 2006/0244337 A1* | 11/2006 | Makita et al. ................. 310/257 |
| 2007/0096574 A1 | 5/2007 | Romagny et al. |
| 2007/0228861 A1* | 10/2007 | Kinoshita ................ 310/156.44 |
| 2008/0211335 A1 | 9/2008 | Abe et al. |
| 2008/0238242 A1 | 10/2008 | Yoshizawa et al. |

FOREIGN PATENT DOCUMENTS

| EP | 2 390 994 A1 | 11/2011 |
| JP | A-2006-141106 | 6/2006 |
| JP | A-2007-520188 | 7/2007 |
| JP | A-2008-043138 | 2/2008 |

(Continued)

OTHER PUBLICATIONS

Takeuchi, Toshie, "Drive Motor Using Electromagnets Instead of Permanent Magnets," *Nikkei Automotive Technology*, Nikkei Business Publications, 2011, No. 22, pp. 102-105 (with partial translation).

(Continued)

*Primary Examiner* — Terrance Kenerly
(74) *Attorney, Agent, or Firm* — Oliff PLC

(57) ABSTRACT

An electromagnetic coupling comprises a stator, a first rotor in which a first polar tooth and a second polar tooth are provided along a circumferential direction in an alternating manner, and a second rotor. The first rotor comprises a first polar tooth ring in which a plurality of the first polar teeth are provided along a circumferential direction with a gap therebetween, and a second polar tooth ring in which a plurality of the second polar teeth are provided along a circumferential direction with a gap therebetween, and which is placed opposing the first polar tooth ring such that the second polar teeth are placed in respective gaps between adjacent ones of the first polar teeth.

4 Claims, 17 Drawing Sheets

(56) References Cited

FOREIGN PATENT DOCUMENTS

| | | |
|---|---|---|
| JP | A-2008-245471 | 10/2008 |
| JP | A-2008-245484 | 10/2008 |
| JP | A-2009-194983 | 8/2009 |

OTHER PUBLICATIONS

Office Action issued in Japanese Patent Application No. 2012-131604 dated May 13, 2014 (with translation).

* cited by examiner

ELECTROMAGNETIC COUPLING

PRIORITY INFORMATION

This application claims priority to Japanese Patent Application No. 2012-131604 filed on Jun. 11, 2012, which is incorporated herein by reference in its entirety.

BACKGROUND

1. Technical Field

The present invention relates to an electromagnetic coupling which transmits rotation from a drive shaft to a driven shaft.

2. Related Art

As a coupling (shaft coupler) for transmitting rotation from a drive shaft to a driven shaft, there is known an electromagnetic coupling which transmits the rotation from the drive shaft to the driven shaft by means of an electromagnetic action.

For example, JP 2008-245484 A discloses an electromagnetic coupling 100 as shown in FIG. 16. The electromagnetic coupling 100 comprises a first rotor 101 and a second rotor 102. The first rotor 101 has a circular column shape, and a permanent magnet is provided on an outer peripheral surface thereof. The second rotor 102 has an approximate circular cylindrical shape, and the first rotor 101 is inserted into a hollow portion of the second rotor 102. In the second rotor 102, a magnetic path 106 made of a material with a high magnetic permeability is provided on a structure 104 having a low magnetic permeability. As shown in FIG. 17, two (a pair of) magnetic paths 106 are provided in a circumferential direction of the second rotor 102, and three such pairs are provided along a rotational shaft direction of the second rotor 102.

The first rotor 101 and the second rotor 102 are housed in a housing 107. In a part of the housing 107 facing the second rotor 102, there is provided a core 110 around which a coil 108 is wound. When a current is applied to the coil, a magnetic flux is generated at the periphery of the coil 108. When the magnetic flux passes through the magnetic path 106 of the second rotor 102, the magnetic path 106 is magnetized.

When the first rotor 101 is rotated in this state, the permanent magnet provided on the first rotor 101 and the magnetized second rotor 102 are attracted to each other, causing the second rotor 102 to also rotate. In this manner, the rotation of the first rotor 101 is transmitted to the second rotor 102.

In addition, when an AC current is supplied to the coil 108, a rotational magnetic field is generated at the periphery of the coil 108. By applying the rotational magnetic field to the second rotor 102, it becomes possible to rotate the second rotor 102 at a rotation rate different from that of the first rotor 101. For example, when the rotational magnetic field is applied to the second rotor 102 along the rotational direction of the first rotor 101, the rotation rate of the second rotor 102 becomes greater than the rotation rate of the first rotor 101.

A reference, Toshie TAKEUCHI, "Analysis of EV/HEV Components, Vol. 10," Nikkei Automotive Technology, Nikkei Business Publications, Jan. 1, 2011, No. 22, p. 102-105, discloses a motor which uses an electromagnet in place of a permanent magnet.

With regard to the rotor to which the rotational magnetic field is applied, if the ratio occupied by the magnetic path is small, there is a possibility that the magnetic coupling force with the other rotor becomes weak. An advantage of the present invention lies in provision of an electromagnetic coupling which can strengthen the magnetic coupling force between rotors as compared with the related art.

SUMMARY

According to one aspect of the present invention, there is provided an electromagnetic coupling. The electromagnetic coupling comprises a stator around which a coil for generating a rotational magnetic field is wound. The electromagnetic coupling further comprises a first rotor which is provided on an outer peripheral side of the stator in a rotatable manner with respect to the stator, and in which a first polar tooth which becomes one of magnetic poles of the rotational magnetic field and a second polar tooth which becomes the other magnetic pole are provided along a circumferential direction in an alternating manner. The electromagnetic coupling further comprises a second rotor which is provided on an outer peripheral side of the first rotor in a rotatable manner with respect to the first rotor and in which a plurality of permanent magnets are placed along a circumferential direction. The electromagnetic coupling further comprises a detecting unit which detects rotations of the first rotor and the second rotor, and a controller which changes a supplied current to the coil to change the rotational magnetic field so as to control a relative rotation rate between the first rotor and the second rotor. The first rotor comprises a first polar tooth ring in which a plurality of the first polar teeth are provided along a circumferential direction with a gap therebetween, and a second polar tooth ring in which a plurality of the second polar teeth are provided along a circumferential direction with a gap therebetween, and which is placed opposing the first polar tooth ring such that the second polar teeth are placed in respective gaps between adjacent ones of the first polar teeth.

According to another aspect of the present invention, there is provided an electromagnetic coupling comprising a stator which is formed in a circular cylindrical shape and around which a coil for generating a rotational magnetic field is wound. The electromagnetic coupling also comprises a first rotor which is formed in a circular cylindrical shape, and provided on an inner peripheral side of the stator in a rotatable manner with respect to the stator, and in which a first polar tooth which becomes one of magnetic poles of the rotational magnetic field and a second polar tooth which becomes the other magnetic pole are provided along a circumferential direction in an alternating manner. The electromagnetic coupling further comprises a second rotor which is provided on an inner peripheral side of the first rotor in a rotatable manner with respect to the first rotor and in which a plurality of permanent magnets are placed along a circumferential direction. The electromagnetic coupling further comprises a detecting unit which detects rotations of the first rotor and the second rotor, and a controller which changes a supplied current to the coil to change the rotational magnetic field so as to control a relative rotation rate between the first rotor and the second rotor. The first rotor comprises a first polar tooth ring in which a plurality of the first polar teeth are provided along a circumferential direction with a gap therebetween, and a second polar tooth ring in which a plurality of the second polar teeth are provided along a circumferential direction with a gap therebetween, and which is placed opposing the first polar tooth ring such that the second polar teeth are placed in respective gaps between adjacent ones of the first polar teeth.

DETAILED DESCRIPTION

Figure 1:
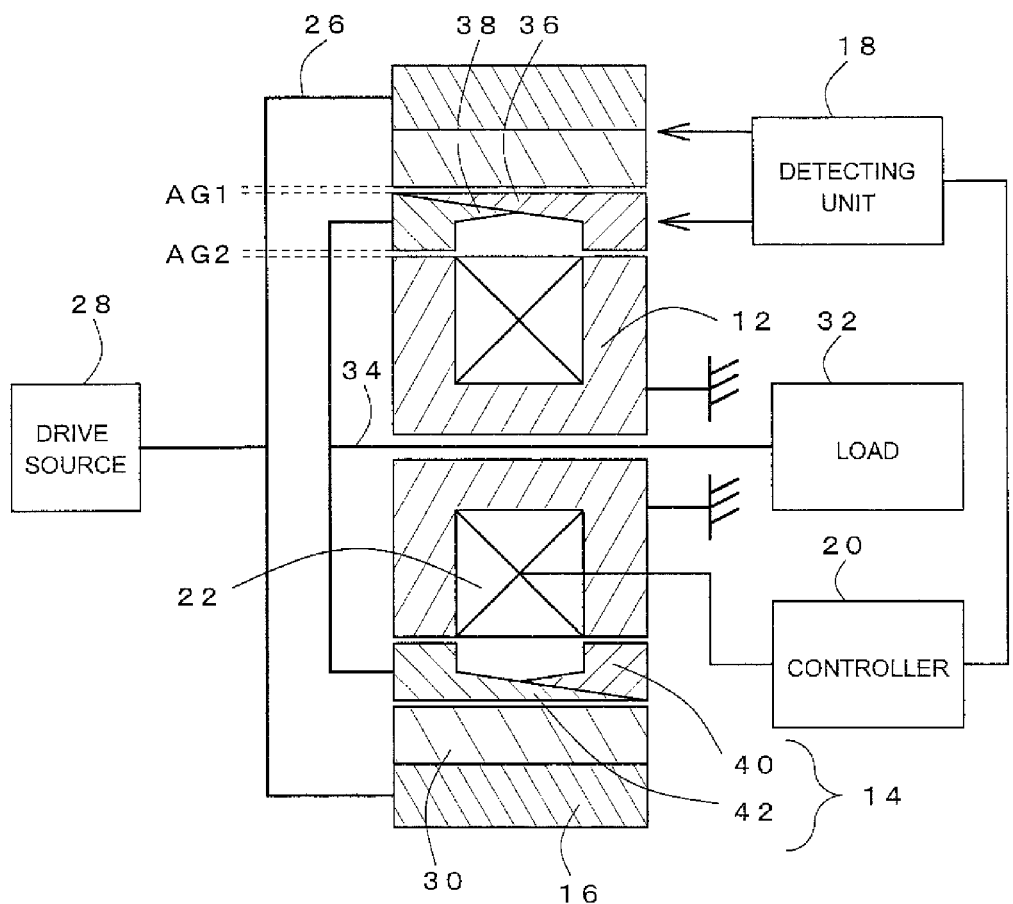
FIG. 1 is a cross sectional side view exemplifying an electromagnetic coupling according to a preferred embodiment of the present invention.

FIG. 1 exemplifies a cross sectional side view of an electromagnetic coupling 10 according to a preferred embodiment of the present invention. The electromagnetic coupling 10 comprises a stator 12, a first rotor 14, a second rotor 16, a detecting unit 18, and a controller 20.

A coil 22 for generating a rotational magnetic field is wound around the stator 12. The stator 12 may have a circular column shape or a circular cylindrical shape. In addition, in order to prevent protrusion of the coil 22 out in the central shaft direction of the stator 12, a flange may be formed on both ends of the stator 12. The stator 12 may be formed from a material having high magnetic permeability, and may be formed, for example, from iron. The stator 12 may be fixed on a fixing unit such as a casing (not shown).

The second rotor 16 is provided on an outer peripheral side of the first rotor 14, and is rotatable with respect to the first rotor 14. For example, an air gap AG1 may be provided between the first rotor 14 and the second rotor 16 so that the first rotor 14 and the second rotor 16 do not contact each other, or a bearing or the like may be provided between the first rotor 14 and the second rotor 16.

Figure 2:
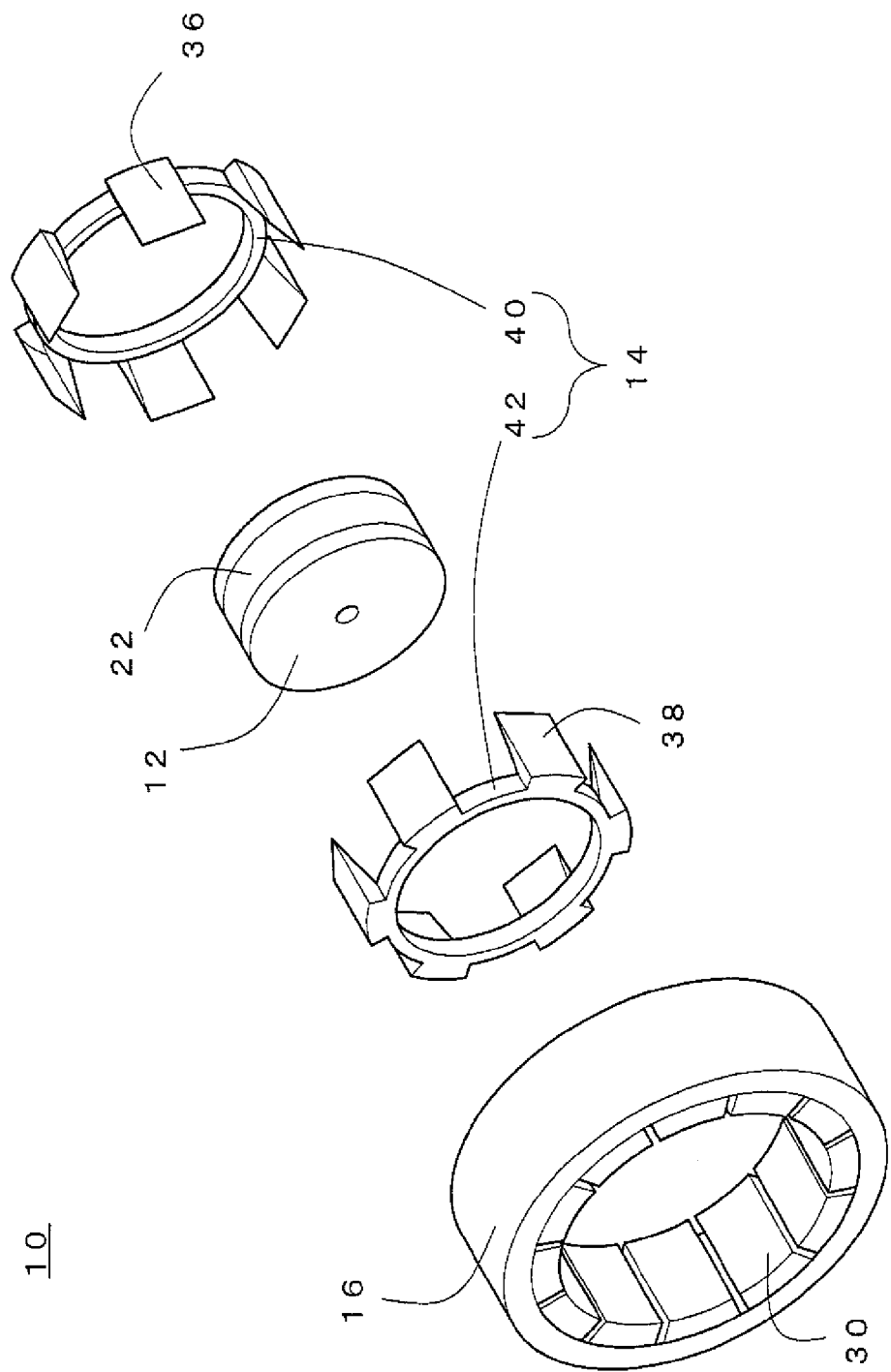
FIG. 2 is an exploded perspective view exemplifying constituting components of the electromagnetic coupling according to the preferred embodiment of the present invention.

As shown in FIG. 2, the second rotor 16 has a circular cylindrical shape, and a plurality of permanent magnets 30 are placed on an inner peripheral surface of the second rotor 16 along a circumferential direction. The permanent magnets 30 may be placed such that the magnetic poles (N poles and S poles) are alternately provided along the circumferential direction.

With reference again to FIG. 1, the second rotor 16 may be connected to a drive source side rotational shaft 26 connected to a drive source 28. The drive source 28 may be an internal combustion engine for a vehicle or a rotary electric machine. A rotation of the drive source 28 is transmitted to the drive source side rotational shaft 26, which causes the second rotor 16 to rotate.

The detecting unit 18 detects rotations of the first rotor 14 and the second rotor 16. The detecting unit 18 may be, for example, a rotational angle sensor such as a resolver and a rotary encoder. Rotational angles of the first rotor 14 and the second rotor 16 detected by the detecting unit 18 are transmitted to the controller 20.

The controller 20 controls a relative rotation rate between the first rotor 14 and the second rotor 16. The controller 20 changes a supplied current to the coil 22 to change the rotational magnetic field of the coil 22, to control the relative rotation rate between the second rotor 16 and the first rotor 14. The rotational control will be described in detail later. The controller 20 also determines a rotational direction of the first rotor 14 based on the rotational angle of the first rotor 14 detected by the detecting unit 18, and controls the current to achieve a rotational magnetic field matching the rotational direction. The controller 20 may be, for example, a computer having a calculation circuit such as a CPU.

The first rotor 14 is provided on an outer peripheral side of the stator 12 and is rotatable with respect to the stator 12. For example, an air gap AG2 may be provided between the stator 12 and the first rotor 14 so that the stator 12 and the first rotor 14 do not contact each other, or a bearing or the like may be provided between the stator 12 and the first rotor 14.

In addition, the first rotor 14 may be connected to a load side rotational shaft 34 connected to a load 32. The load 32 may be, for example, a wheel of a vehicle. A rotation of the first rotor 14 is transmitted to the load side rotational shaft 34, and, consequently, the rotation is transmitted to the load 32.

The first rotor 14 may have a circular cylindrical shape. In addition, the first rotor 14 comprises a first polar tooth 36 and a second polar tooth 38. A plurality of the first polar teeth 36 and a plurality of the second polar teeth 38 are provided along the circumferential direction in an alternating manner. The first polar tooth 36 functions as one of the magnetic poles (one of the N pole and the S pole) of the rotational magnetic field generated by the coil 22, and the second polar tooth 38 functions as the other magnetic pole (the other pole of the N pole and the S pole).

Here, the first rotor 14 may be formed by combining a member in which the first polar teeth 36 are provided and a member in which the second polar teeth 38 are provided. For example, as shown in FIG. 2, a configuration may be employed in which the first rotor 14 is formed by combining a first polar tooth ring 40 in which the first polar teeth 36 are provided and a second polar tooth ring 42 in which the second polar teeth 38 are provided.

The first polar tooth ring 40 may have a structure in which a plurality of the first polar teeth 36 are formed on a ring-shaped member along a circumferential direction with a gap therebetween. Similarly, the second polar tooth ring 42 may have a structure in which a plurality of the second polar teeth 38 are formed on a ring-shaped member along a circumferential direction with a gap therebetween. The gap between adjacent ones of the first polar teeth 36 in the first polar tooth ring 40 may be slightly wider than a width of the second polar tooth 38 in the circumferential direction. Similarly, the gap between adjacent ones of the second polar teeth 38 in the second polar tooth ring 42 may be slightly wider than a width of the first polar tooth 36 in the circumferential direction.

The first rotor 14 is formed by combining the first polar tooth ring 40 and the second polar tooth ring 42 in a manner to oppose each other. In this process, a configuration is preferably employed in which the second polar teeth 38 are placed in the respective gaps between the adjacent first polar teeth 36. In this process, preferably, no magnetic path is formed between the first polar tooth ring 40 and the second polar tooth ring 42. For example, an air gap may be provided between the first polar tooth 36 and the second polar tooth 38, or a material having no magnetic permeability, such as a resin or aluminum, may be filled between the first polar tooth 36 and the second polar tooth 38. The magnetically non-permeable material refers to, for example, a material having a magnetic permeability of less than or equal to 10.0. Alternatively, the first polar tooth ring 40 and the second polar tooth ring 42 may be connected by a fastening member made of a magnetically non-permeable material.

Figure 3:
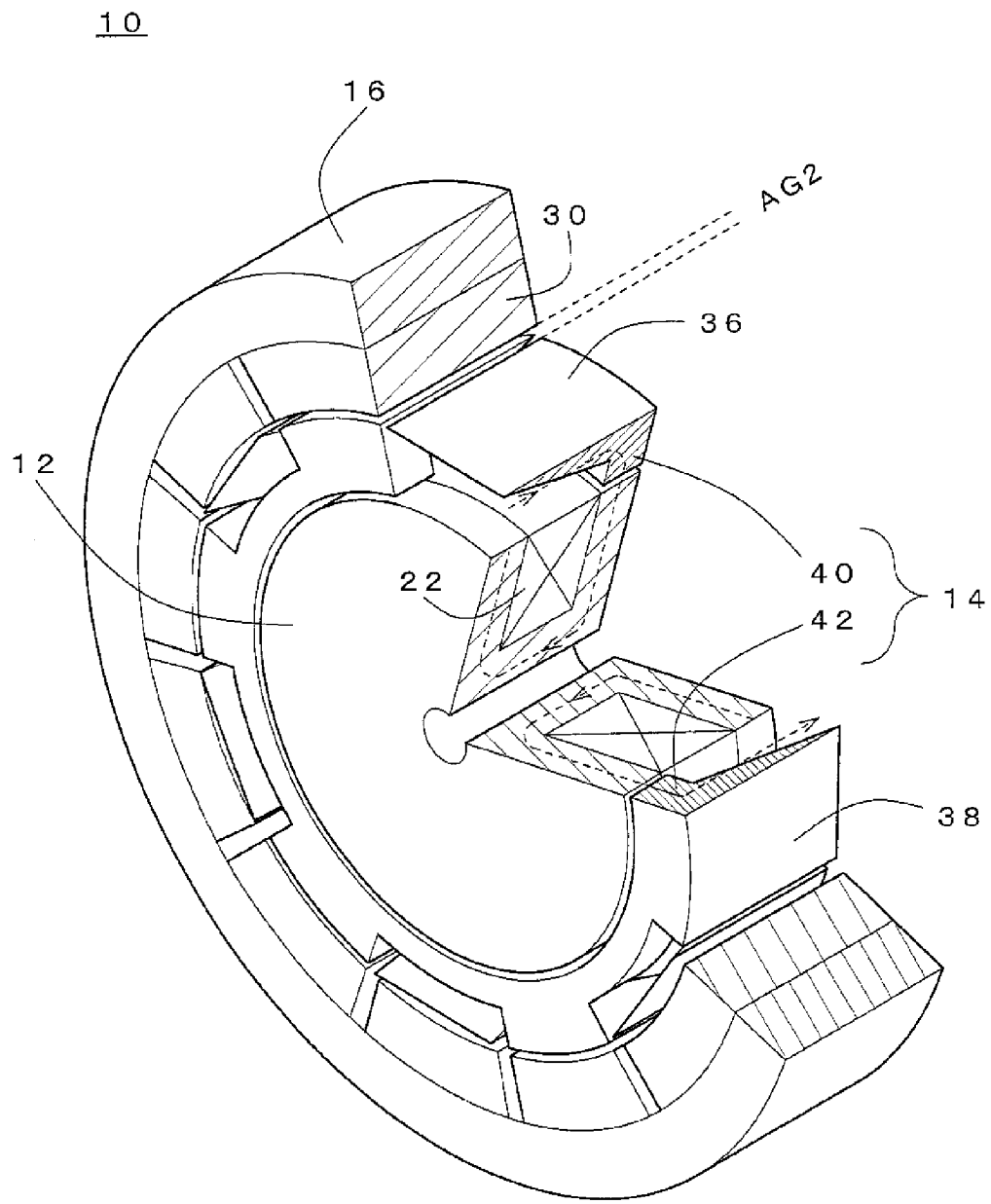
FIG. 3 is a partial cross sectional view exemplifying the electromagnetic coupling according to the preferred embodiment of the present invention.

FIG. 3 shows a state where the first polar tooth 36 and the second polar tooth 38 are magnetized by a magnetic field generated by the coil 22. When a current is supplied to the coil 22, a magnetic flux represented by a broken line is generated at the periphery of the coil 22. The magnetic flux passes through the stator 12 and the air gap AG2, and reaches the first polar tooth 36 and the second polar tooth 38. As shown in FIG. 3, no magnetic path is formed between the first polar tooth 36 and the second polar tooth 38, and, therefore, one of the polar teeth functions as one of the magnetic poles and the other polar tooth functions as the other magnetic pole. Because the first polar teeth 36 and the second polar teeth 38 are placed in an alternating manner, the one magnetic pole and the other magnetic pole are also placed in an alternating manner.

Figure 4:
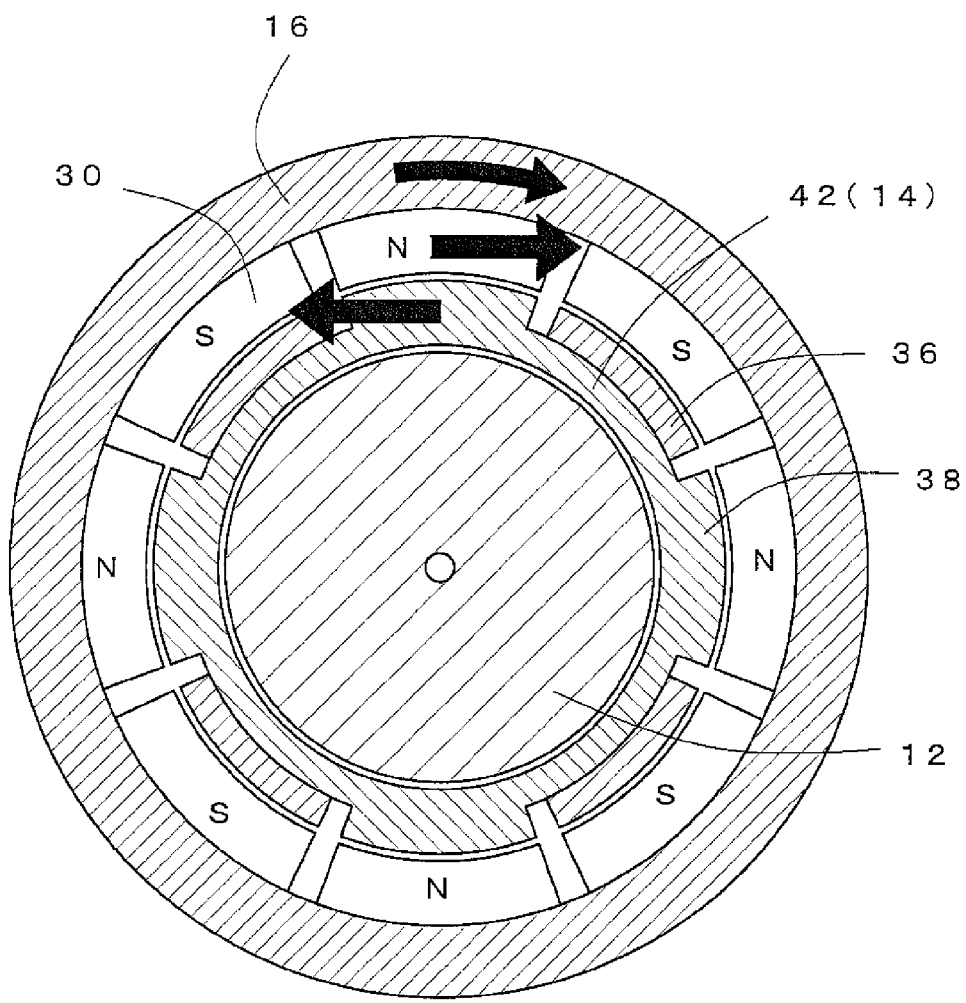
FIG. 4 is a cross sectional front view exemplifying the electromagnetic coupling according to the preferred embodiment of the present invention.

A control of a relative rotation rate between the first rotor 14 which is magnetized as described above and the second rotor 16 having the permanent magnets 30 will now be described with reference to FIG. 4. FIG. 4 exemplifies a cross sectional front view of the electromagnetic coupling 10. FIG. 4 shows an exemplary case where the second rotor 16 receives the rotational force from the drive source 28 and is rotated in a clockwise direction viewed from the drawing.

A torque and a rotation rate on an input side from which the rotational force is input are represented with $T_{in}$ and $N_{in}$, respectively, and a torque and a rotation rate on an output side are represented with $T_{out}$ and $N_{out}$, respectively. In the exemplified configuration of FIG. 4, the torque of the first rotor 14 is $T_{out}$, and the torque of the second rotor 16 is $T_{in}$. A power (electric power [W]) by the coil 22 is represented by $P_{mg}$. A relationship shown in the following Equation 1 can be obtained with regard to the power on the input side (T×N [W]), the power on the output side, and the power by the coil 22.

$$T_{in} \times N_{in} + P_{mg} = T_{out} \times N_{out} \quad \text{[Equation 1]}$$

Here, the second rotor 16 attempts to apply a clockwise torque on the first rotor 14. In this process, because of the action-reaction relationship, a counterclockwise torque is generated in the first rotor 14. Because the forces are balanced, the torques are equal to each other. Therefore, $T_{in}=T_{out}$. Based on Equation 1, it can be understood that, by changing the power $P_{mg}$, different rotation rates may be assigned for the rotation rate $N_{in}$ on the input side and the rotation rate $N_{out}$ on the output side. In other words, by changing the power $P_{mg}$, the relative rotation rate between the first rotor 14 and the second rotor 16 can be changed.

For example, when the second rotor 16 is the input side, the controller 20 receives the rotation rate $N_{in}$ of the second rotor 16 from the detecting unit 18. In addition, the controller 20 sets the rotation rate $N_{out}$ of the first rotor 14 based on an input of the user, an instruction value which is stored in advance, etc. The controller 20 calculates a difference between the rotation rate $N_{in}$ of the second rotor 16 and the rotation rate $N_{out}$ of the first rotor 14, and, based on Equation 1, also determines the electric power $P_{mg}$ corresponding to the difference. The controller 20 supplies the determined electric power $P_{mg}$ to the coil 22.

When it is desired to synchronize the rotations of the first rotor 14 and the second rotor 16 ($N_{in}=N_{out}$), a DC current may be supplied to the coil 22 to set the work by the coil 22 to 0.

When the rotation rate $N_{out}$ on the output side is lower than the rotation rate $N_{in}$ on the input side, the electric power $P_{mg}$ has a negative value. In other words, by setting the rotation rate $N_{out}$ on the output side to be lower than the rotation rate $N_{in}$ on the input side, a regenerative electric power can be obtained. In consideration of this, a power converter such as an AC/DC converter or an electricity storage unit such as a battery may be connected to the coil 22.

Figure 5:
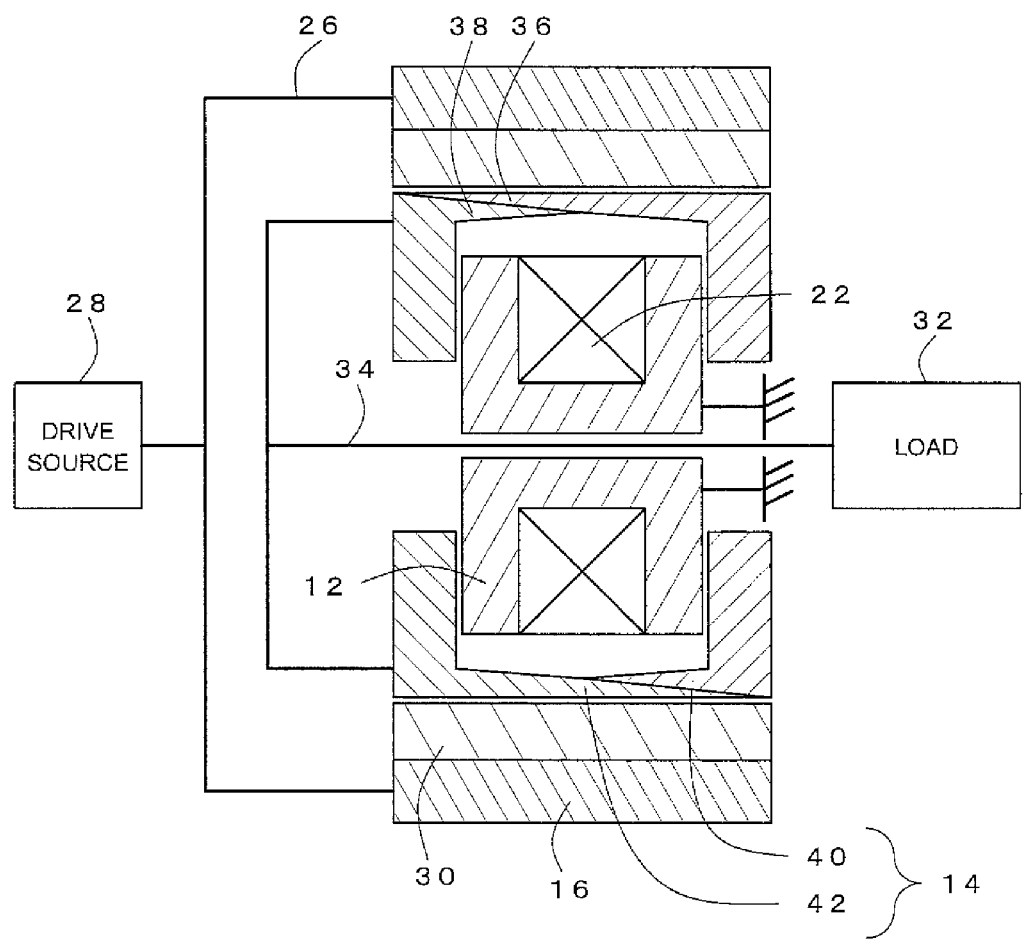
FIG. 5 is a cross sectional side view exemplifying an electromagnetic coupling according to an alternative form of the preferred embodiment of the present invention.

In the embodiment described above, the first rotor 14 is placed to oppose only the outer peripheral surface of the stator 12, but the present invention is not limited to such a configuration. For example, as shown in FIG. 5, the first rotor 14 may be formed in a shape in which a length of the first rotor 14 in the rotational shaft direction is longer than that of the stator 12 and the first rotor 14 covers an end surface of the stator 12 in the rotational shaft direction. With such a configuration, the magnetic flux passing through the first rotor 14 can be increased.

In addition, in the embodiment described above, the stator 12 is placed at a center and the first rotor 14 and the second rotor 16 are placed from the center toward the outer peripheral side, but the present invention is not limited to such a configuration. For example, as shown in FIG. 6, the second rotor 16 may be set at the center, and the first rotor 14 and the stator 12 may be placed from the center toward the outer peripheral side.

Figure 6:
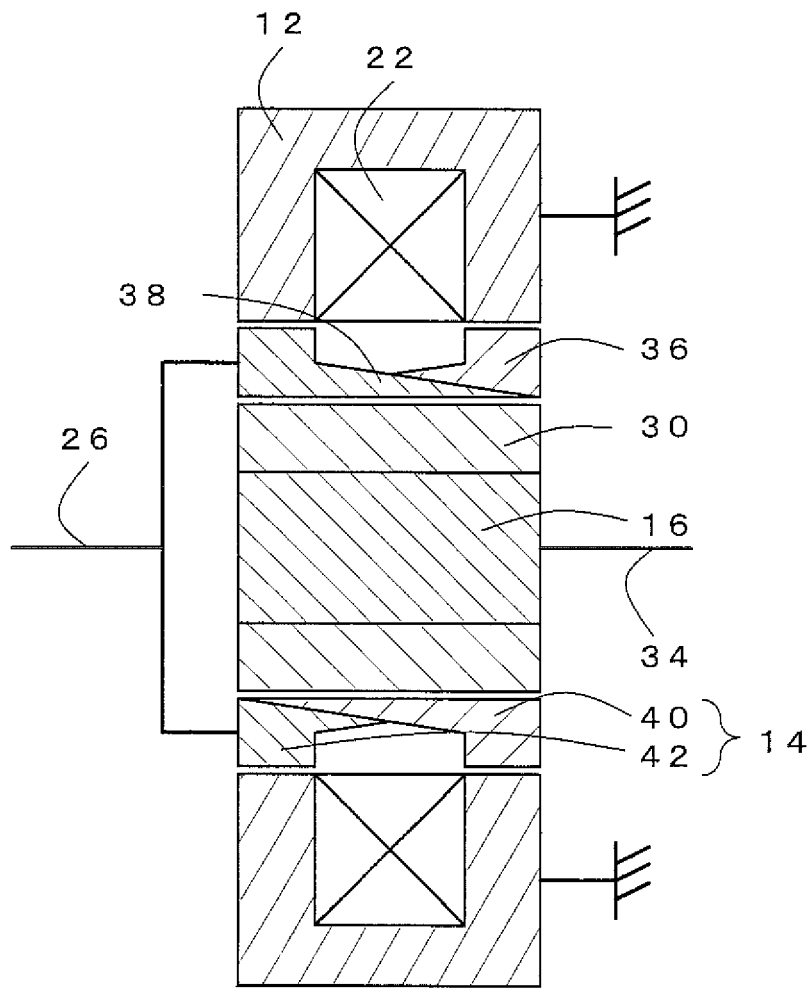
FIG. 6 is a cross sectional side view exemplifying an electromagnetic coupling according to an alternative form of the preferred embodiment of the present invention.

In the electromagnetic coupling 10 shown in FIG. 6, the stator 12 is provided at the outermost outer peripheral side. The stator 12 may be formed in a circular cylindrical shape, and the coil 22 may be wound on an inner peripheral surface of the stator 12. The first rotor 14 may be provided on an inner peripheral side of the stator 12. Similar to the stator 12, the first rotor 14 may be formed in a circular cylindrical shape. The second rotor 16 may be provided on an inner peripheral side of the first rotor 14, and may have a circular column shape. The permanent magnet 30 may be provided on an outer peripheral surface of the second rotor 16 in a manner to oppose the first rotor 14.

Figure 7:
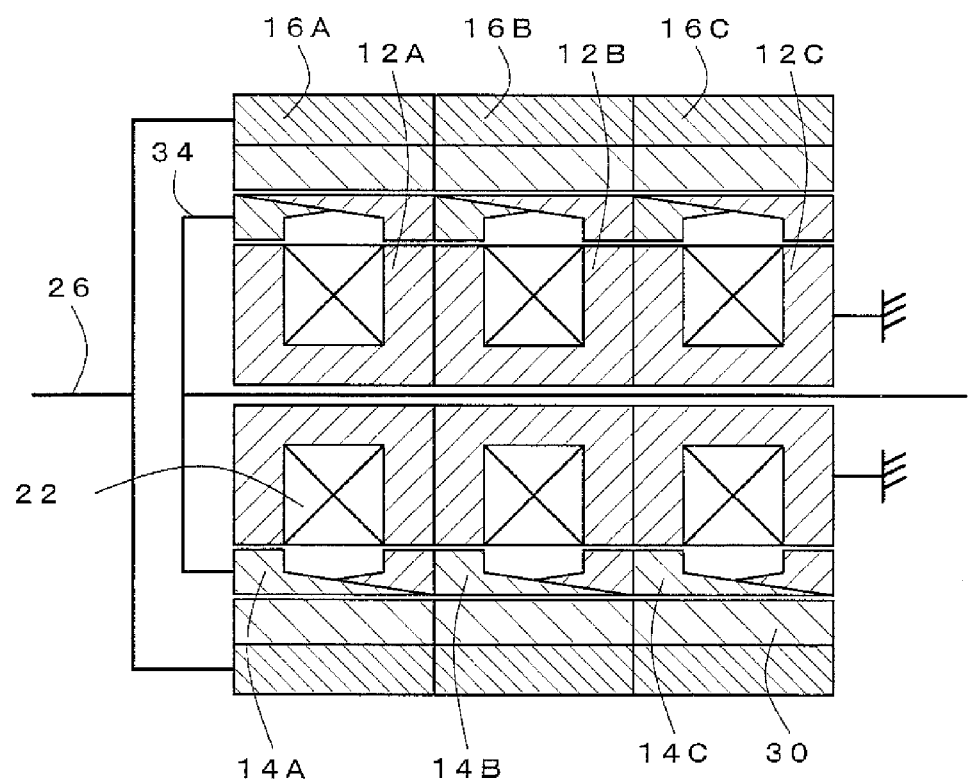
FIG. 7 is a cross sectional side view exemplifying an electromagnetic coupling according to an alternative form of the preferred embodiment of the present invention.

As a structure for effectively applying the rotational magnetic field to the first rotor 14, a plurality of phases of AC electric power may be supplied to the coil 22. FIG. 7 exemplifies an electromagnetic coupling 10 which can supply three-phase AC electric power. Three stators 12A-12C, three first rotors 14A-14C, and three second rotors 16A-16C are provided along the rotational shaft direction. The first rotors 14A-14C may be connected to each other by connecting members made of a magnetically non-permeable material (not shown). The second rotors 16A-16C may be connected to each other by magnetically permeable or magnetically non-permeable connecting members.

Figure 8:
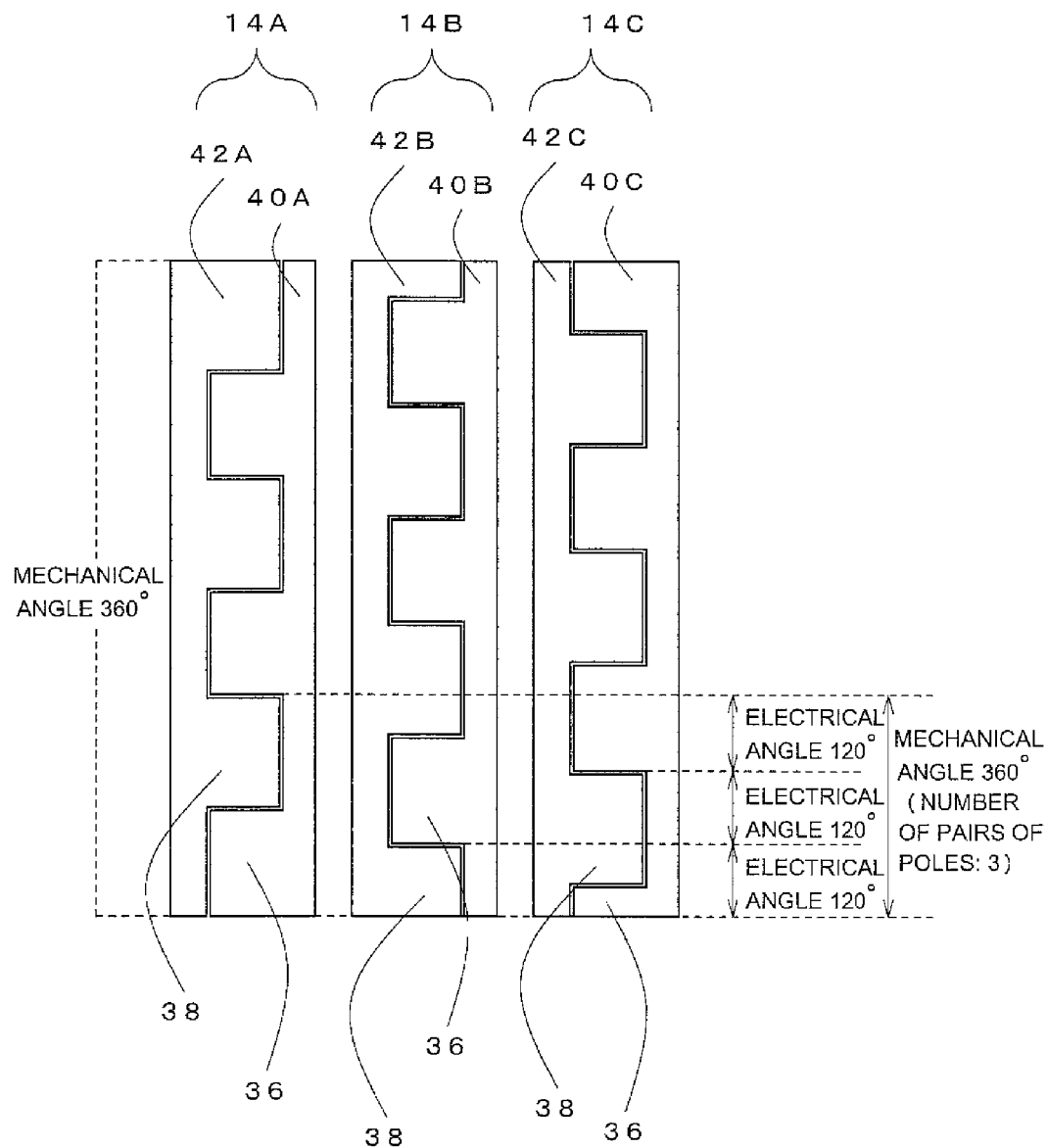
FIG. 8 is a diagram for explaining a placement of polar teeth in an electromagnetic coupling according to an alternative form of the preferred embodiment of the present invention.

The placement of the first polar teeth 36 and the second polar teeth 38 of the first rotors 14A-14C may be that corresponding to the three-phase AC electric power supplied to the stators 12A-12C. FIG. 8 exemplifies a state where the first rotors 14A-14C having a circular cylindrical shape are opened on a plane. Here, the number of pairs of poles in the first rotor 14 is set to 3. The placement of the first polar teeth 36 and the second polar teeth 38 of the first rotors 14A-14C is such that the teeth are shifted in the circumferential direction with a spacing of 120° each in electrical angle.

Figure 9:
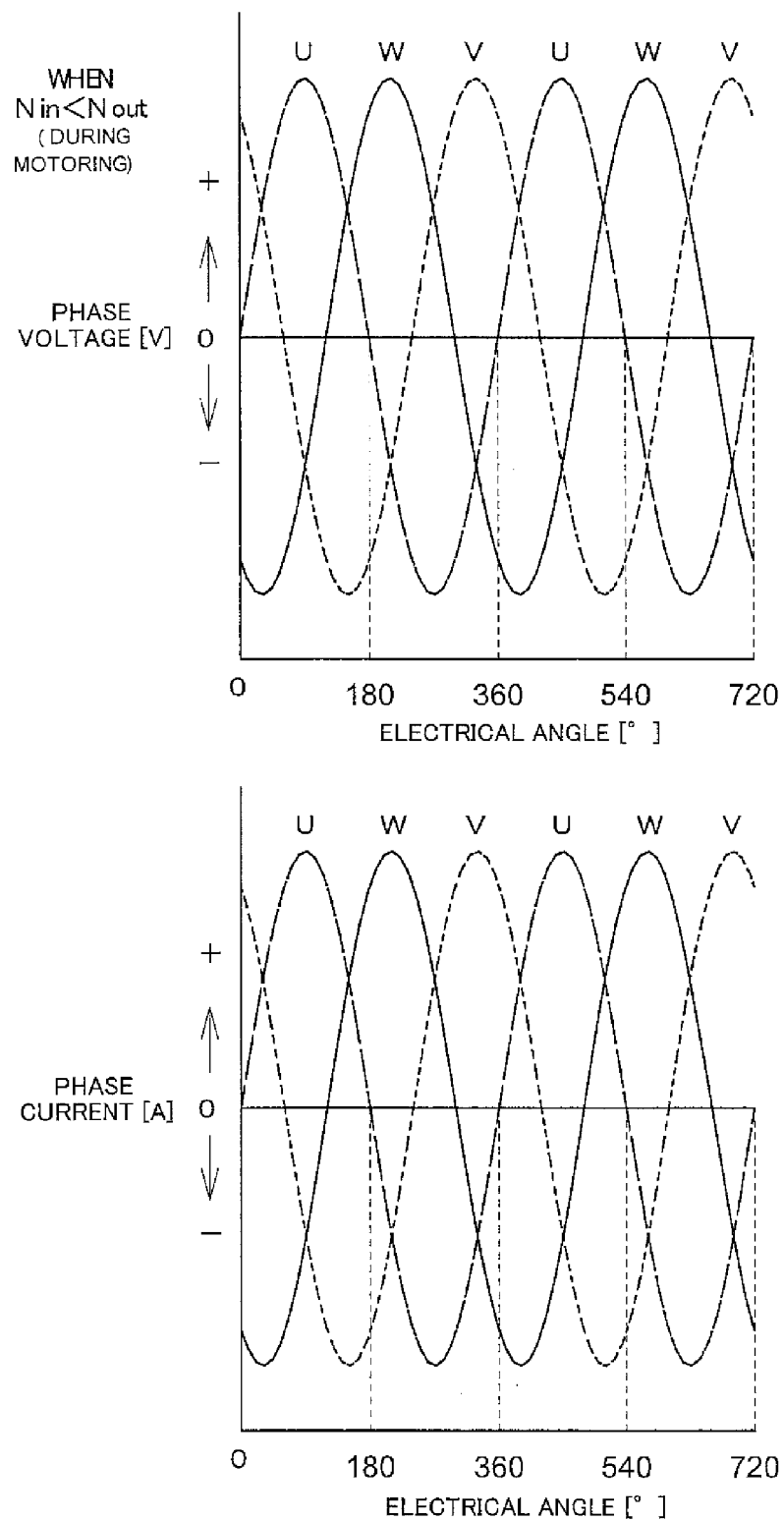
FIG. 9 is a diagram for explaining supply of electric power to an electromagnetic coupling according to an alternative form of the preferred embodiment of the present invention.
Figure 10:
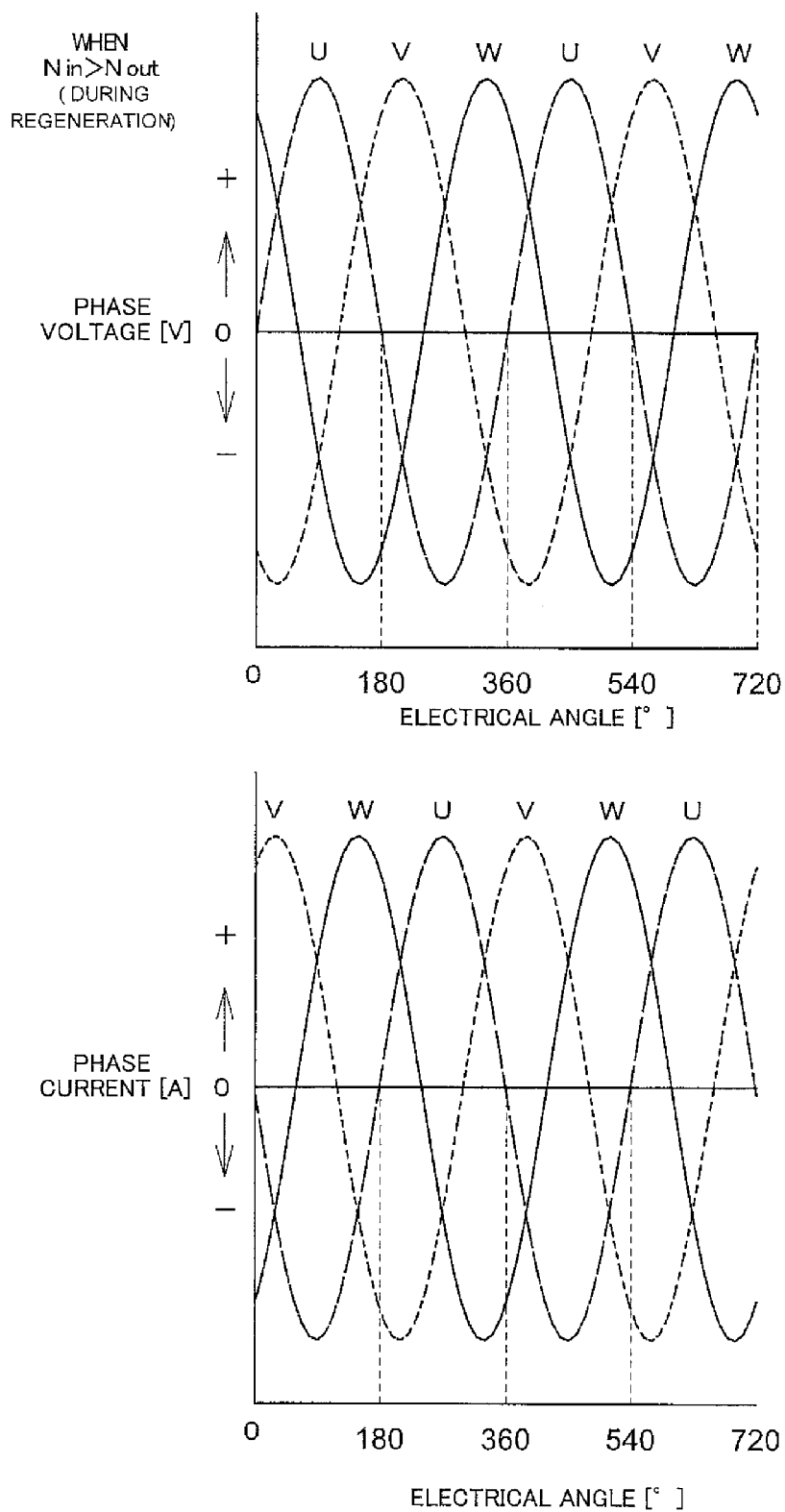
FIG. 10 is a diagram for explaining supply of electric power to an electromagnetic coupling according to an alternative form of the preferred embodiment of the present invention.

FIGS. 9 and 10 show currents and voltages supplied to the stators 12A-12C when the first polar teeth 36 and the second polar teeth 38 are placed in a manner described above. FIG. 9 shows a case where the rotation rate $N_{out}$ on the output side is larger than the rotation rate $N_{in}$ on the input side ($N_{in}$<$N_{out}$); that is, the currents and voltages during motoring. Reference signs U, V, and W shown in the graph show the voltages or currents applied to each of the stators 12A-12C. On an upper part of FIG. 9, there is depicted a state when there is no load and when a reverse electromotive voltage is generated. In this state, a current of a same phase as the voltage is supplied, as shown in a lower part of FIG. 9. With such a configuration, a rotational magnetic field in a same direction as the rotational direction of the input shaft is applied to the first rotor 14, and, consequently, the rotation rate $N_{out}$ on the output side becomes larger than the rotation rate $N_{in}$ on the input side.

FIG. 10 shows the currents and voltages when the rotation rate $N_{out}$ on the output side is smaller than the rotation rate $N_{in}$ on the input side ($N_{in}$>$N_{out}$); that is, during regeneration. When the reverse electromotive voltage is generated as in the upper part of FIG. 10, there is supplied a current of an opposite phase from the electric power waveform. Because the voltage and the current are in opposite phases from each other, the electric power which is a product of the voltage and the current is 0 or a negative value. Thus, the supplied electric power becomes negative, or, in other words, the regenerative electric power can be obtained.

Figure 11:
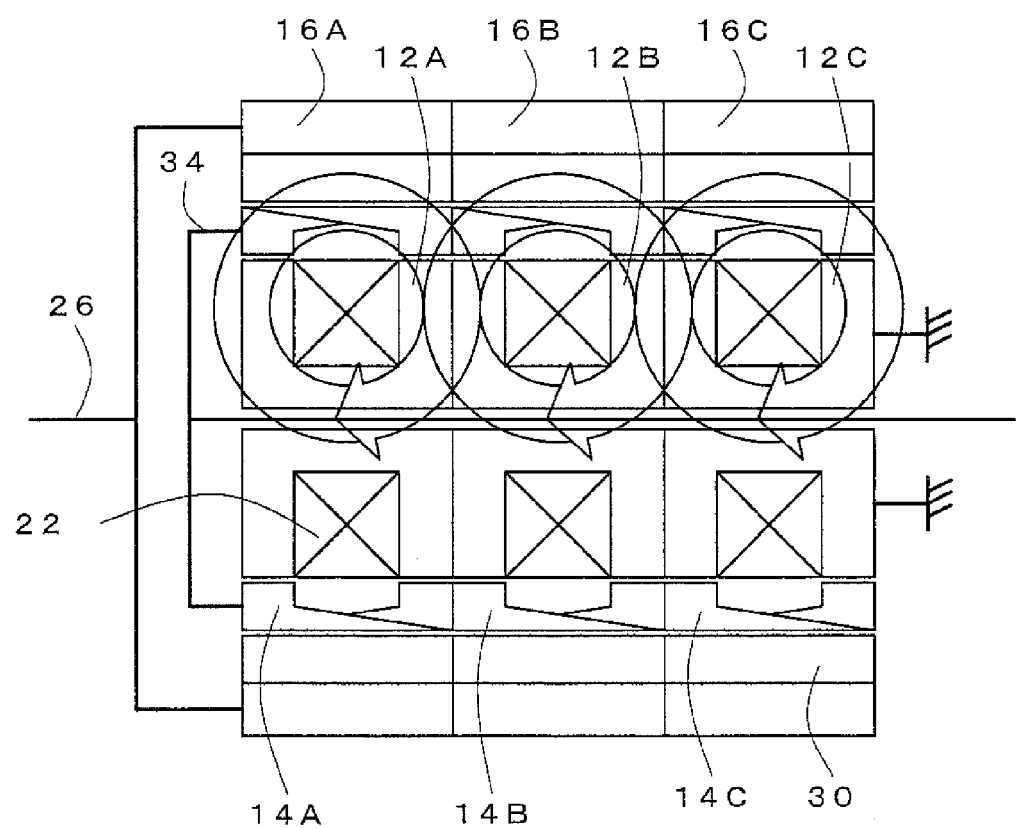
FIG. 11 is a cross sectional side view exemplifying an electromagnetic coupling according to an alternative form of the preferred embodiment of the present invention.

When a three-phase structure is employed for the stator 12 as shown in FIG. 11, the magnetic field of the stator 12B which is at the center is weakened (interfered with) by the magnetic fields of the stators 12A and 12C on both sides. As a result, compared to the magnetic fields of the stators 12A and 12C on both sides, the magnetic field of the stator 12B at the center may become weakened. For example, the maximum value of the strength of the magnetic field may become non-uniform between the stators 12A and 12C and the stator 12B.

Figure 12:
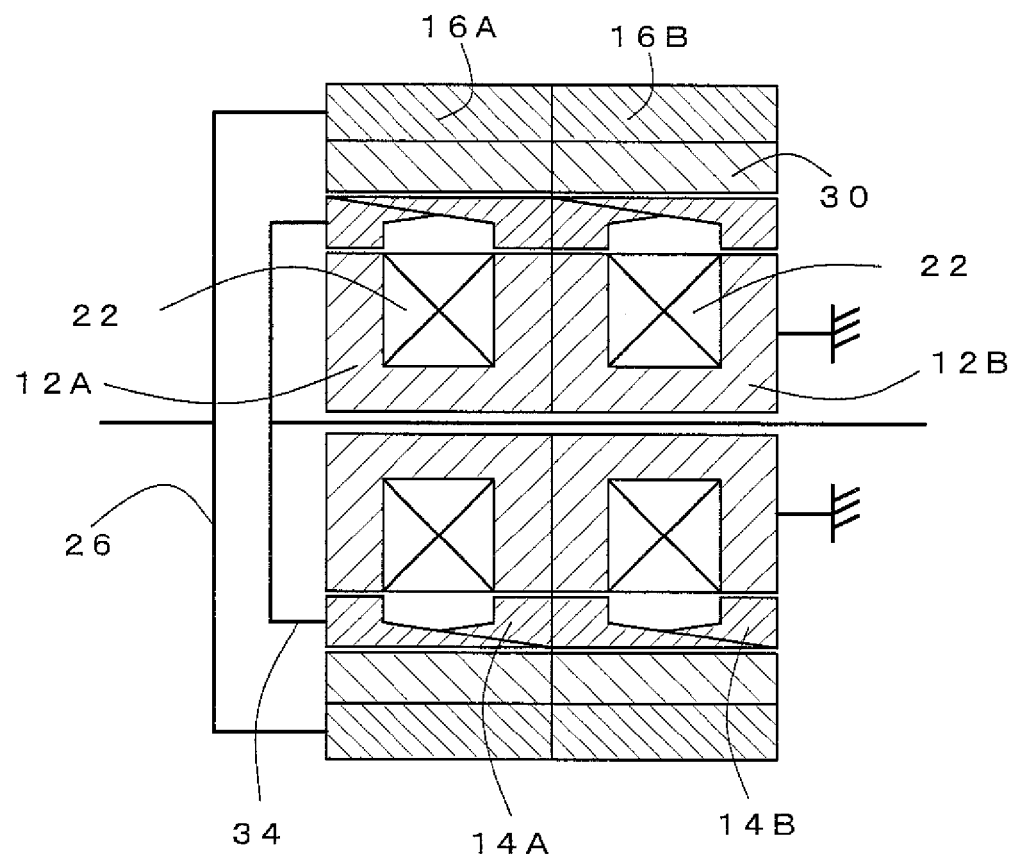
FIG. 12 is a cross sectional side view exemplifying an electromagnetic coupling according to an alternative form of the preferred embodiment of the present invention.

In consideration of this, a two-phase structure may be employed for the stator 12, as shown in FIG. 12. Two stators 12A and 12B, two first rotors 14A and 14B, and two second rotors 16A and 16B are provided along the rotational shaft direction. Similar to the three-phase structure, the first rotors 14A and 14B may be connected to each other by a connecting member made of a magnetically non-permeable material (not shown). The second rotors 16A and 16B may be connected to each other by a magnetically permeable or magnetically non-permeable connecting member.

The magnetic field generated from the stator 12A is weakened by the magnetic field of the stator 12B, but the magnetic field of the stator 12B is also weakened by the magnetic field of the stator 12A. As a result, the maximum values of the strengths of the magnetic fields in the stators become approximately equal to each other.

Figure 13:
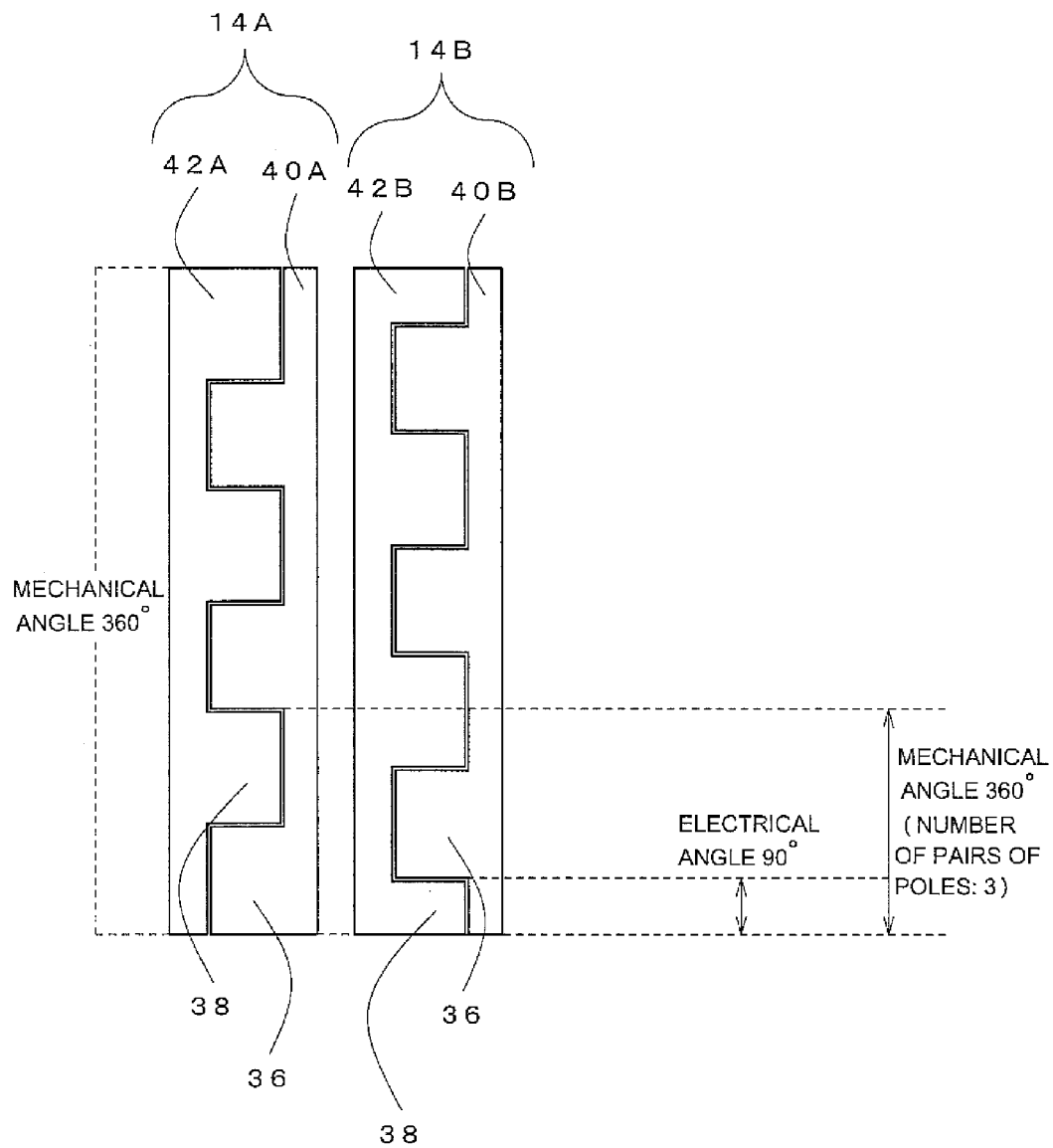
FIG. 13 is a diagram for explaining a placement of polar teeth in an electromagnetic coupling according to an alternative form of the preferred embodiment of the present invention.

FIG. 13 exemplifies a state where the first rotors 14A and 14B having a circular cylindrical shape are opened on a plane. Here, in order to facilitate comparison with the three-phase structure, the number of pairs of poles in the first rotor 14 is set to 3. The placements of the first polar teeth 36 and the second polar teeth 38 of the first rotors 14A and 14B are such that the polar teeth are shifted in the circumferential direction with a spacing of 90° each in an electrical angle.

Figure 14:
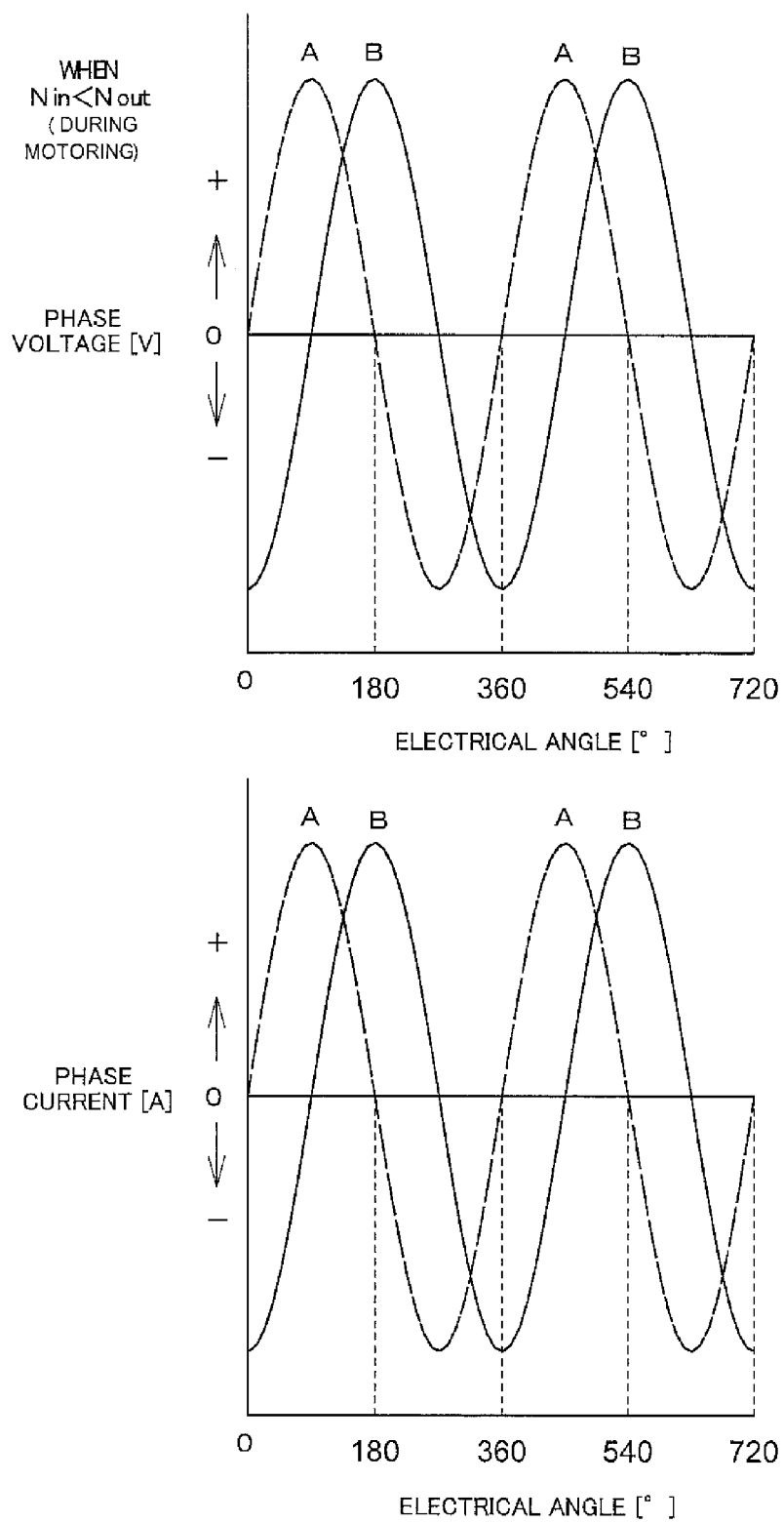
FIG. 14 is a diagram for explaining supply of electric power to an electromagnetic coupling according to an alternative form of the preferred embodiment of the present invention.
Figure 15:
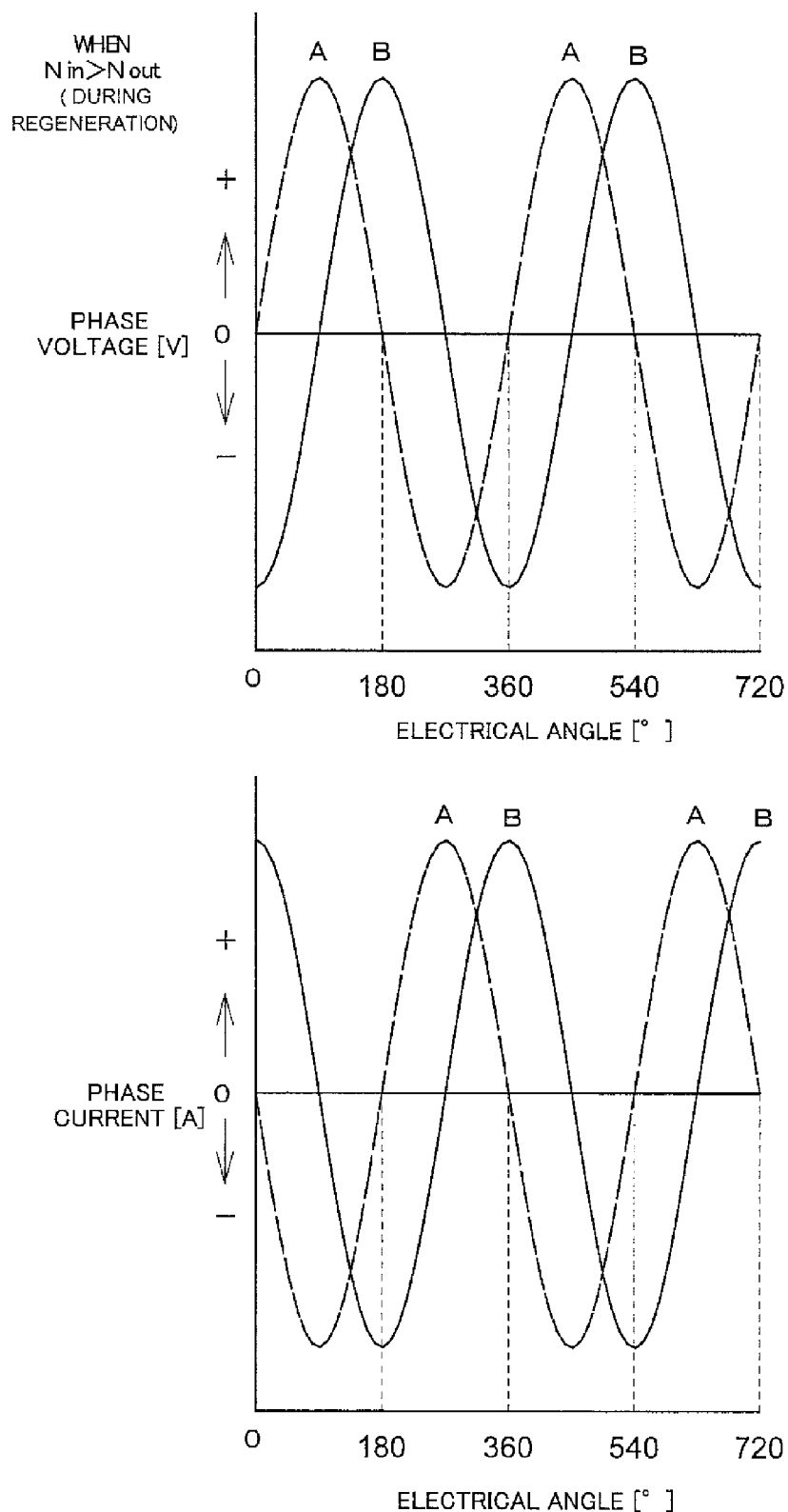
FIG. 15 is a diagram for explaining supply of electric power to an electromagnetic coupling according to an alternative form of the preferred embodiment of the present invention.
Figure 16:
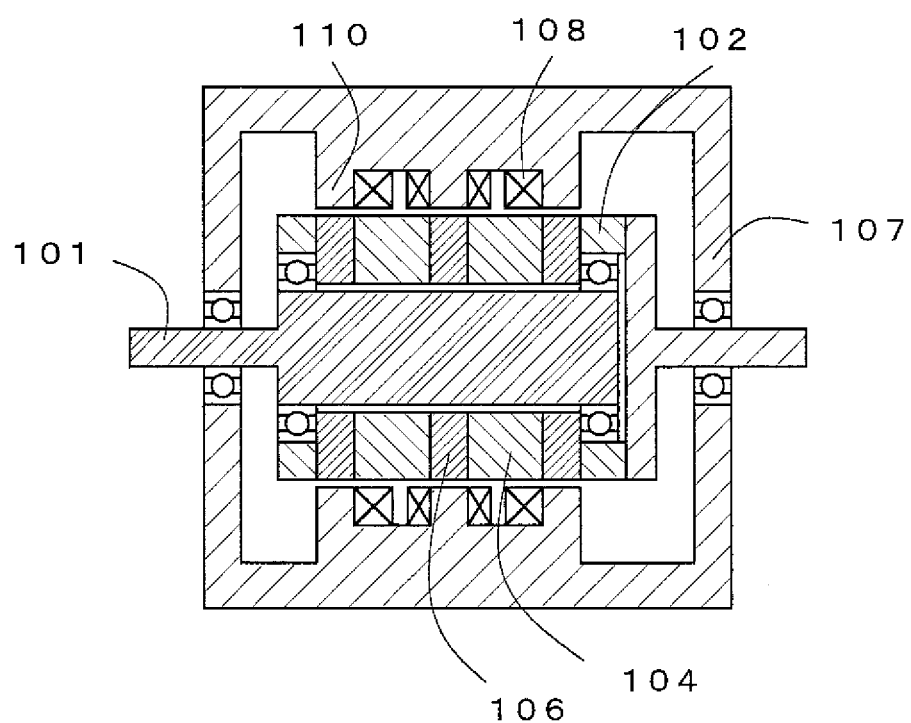
FIG. 16 is a cross sectional side view exemplifying an electromagnetic coupling of the related art.
Figure 17:
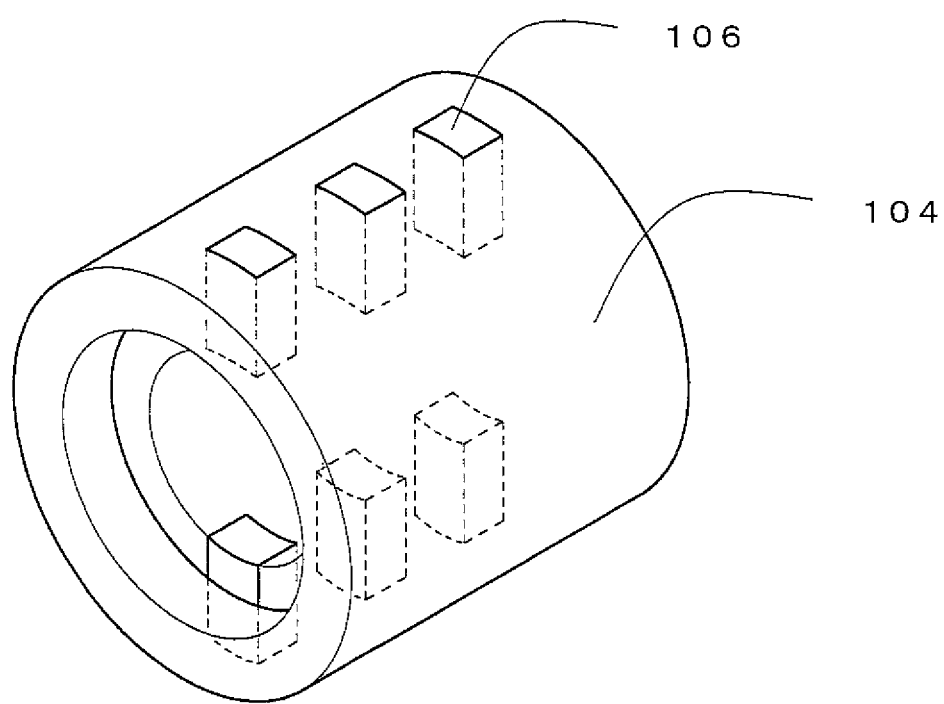
FIG. 17 is a perspective diagram exemplifying an electromagnetic coupling of the related art.

FIGS. 14 and 15 show currents and voltages supplied to the stators 12A and 12B when the first polar teeth 36 and the second polar teeth 38 are placed in this manner. FIG. 14 shows a case when the rotation rate $N_{out}$ on the output side is larger than the rotation rate $N_{in}$ on the input side ($N_{in}$<$N_{out}$); that is, the currents and voltages during motoring. Reference signs A and B shown in the graph show the voltages or currents applied to each of the stators 12A and 12B. On an upper part of FIG. 14, there is shown a state in which there is no load and a reverse electromotive voltage is generated. In this state, a current of the same phase as the voltage is supplied as shown in a lower part of FIG. 14. In this manner, a rotational magnetic field of the same direction as the rotational direction of the input shaft is applied to the first rotor 14, and, consequently, the rotation rate $N_{out}$ on the output side becomes larger than the rotation rate $N_{in}$ on the input side.

FIG. 15 shows the currents and voltages in a case where the rotation rate $N_{out}$ on the output side is smaller than the rotation rate $N_{in}$ on the input side ($N_{in}$>$N_{out}$); that is, during regeneration. A current of an opposite phase from the electric power waveform is supplied when the reverse electromotive voltage is generated as shown in an upper part of FIG. 15. Because the voltage and the current are of opposite phases, the electric power which is a product of the voltage and the current is 0 or a negative value, and, thus, a regenerative electric power can be obtained.

What is claimed is:

1. An electromagnetic coupling comprising:
    a stator around which a coil for generating a rotational magnetic field is wound;
    a first rotor which is provided on an outer peripheral side of the stator in a rotatable manner with respect to the stator, and in which a first polar tooth which becomes one of magnetic poles of the rotational magnetic field and a second polar tooth which becomes the other magnetic pole are provided along a circumferential direction in an alternating manner;
    a second rotor which is provided on an outer peripheral side of the first rotor in a rotatable manner with respect to the first rotor and in which a plurality of permanent magnets are placed along a circumferential direction;
    a detecting unit which detects rotations of the first rotor and the second rotor; and
    a controller which changes a supplied current to the coil to change the rotational magnetic field so as to control a relative rotation rate of the first rotor and the second rotor, wherein
    the first rotor comprises:
    a first polar tooth ring in which a plurality of the first polar teeth are provided along a circumferential direction with a gap therebetween; and
    a second polar tooth ring in which a plurality of the second polar teeth are provided along a circumferential direction with a gap therebetween, and which is placed opposing the first polar tooth ring such that the second polar teeth are placed in respective gaps between adjacent ones of the first polar teeth, wherein a length of the first rotor in a rotational shaft direction is longer than a length of the stator, and the first rotor covers an end surface of the stator in the rotational shaft direction.

2. The electromagnetic coupling according to claim 1, wherein a plurality of the stators, a plurality of the first rotors, and a plurality of the second rotors are provided along a rotational shaft direction of the first rotor.

3. The electromagnetic coupling according to claim 2, wherein two stators, two first rotors, and two second rotors are provided along the rotational shaft direction of the first rotor.

4. An electromagnetic coupling, comprising:

a stator which is formed in a circular cylindrical shape and around which a coil for generating a rotational magnetic field is wound;

a first rotor which is formed in a circular cylindrical shape, and provided on an inner peripheral side of the stator in a rotatable manner with respect to the stator, and in which a first polar tooth which becomes one of magnetic poles of the rotational magnetic field and a second polar tooth which becomes the other magnetic pole are provided along a circumferential direction in an alternating manner;

a second rotor which is provided on an inner peripheral side of the first rotor in a rotatable manner with respect to the first rotor and in which a plurality of permanent magnets are placed along a circumferential direction;

a detecting unit which detects rotations of the first rotor and the second rotor; and a controller which changes a supplied current to the coil to change the rotational magnetic field so as to control a relative rotation rate between the first rotor and the second rotor, wherein the first rotor comprises:

a first polar tooth ring in which a plurality of the first polar teeth are provided along a circumferential direction with a gap therebetween; and a second polar tooth ring in which a plurality of the second polar teeth are provided along a circumferential direction with a gap therebetween, and which is placed opposing the first polar tooth ring such that the second polar teeth are placed in respective gaps between adjacent ones of the first polar teeth, wherein a length of the first rotor in a rotational shaft direction is longer than a length of the stator, and the first rotor covers an end surface of the stator in the rotational shaft direction.

* * * * *